(12) United States Patent
Tsukamoto et al.

(10) Patent No.: US 7,843,168 B2
(45) Date of Patent: *Nov. 30, 2010

(54) BATTERY PACK SYSTEM

(75) Inventors: Hisashi Tsukamoto, Santa Clarita, CA (US); Tiehua Piao, Valencia, CA (US); Taison Tan, Pasadena, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/462,095

(22) Filed: Jul. 28, 2009

(65) Prior Publication Data

US 2009/0289598 A1 Nov. 26, 2009

Related U.S. Application Data

(63) Continuation of application No. 11/603,757, filed on Nov. 22, 2006, now Pat. No. 7,573,234.

(60) Provisional application No. 60/740,204, filed on Nov. 28, 2005, provisional application No. 60/753,862, filed on Dec. 22, 2005.

(51) Int. Cl.
*H01M 10/46* (2006.01)
(52) U.S. Cl. ...................................... 320/116
(58) Field of Classification Search ............... 320/106, 320/107, 110, 116, 117, 118, 122
See application file for complete search history.

(56) References Cited

U.S. PATENT DOCUMENTS

| 2,901,526 | A | 8/1959 | Alton et al. |
|---|---|---|---|
| 3,769,095 | A | 10/1973 | Schmidt |
| 4,255,782 | A | 3/1981 | Joyce |
| 4,916,034 | A | 4/1990 | Hulsebus et al. |
| 4,957,829 | A | 9/1990 | Holl |
| 5,017,441 | A | 5/1991 | Linder |
| 5,140,744 | A | 8/1992 | Miller |
| 5,298,341 | A | 3/1994 | Khandkar et al. |
| 5,302,110 | A | 4/1994 | Desai et al. |
| 5,378,555 | A | 1/1995 | Waters et al. |
| 5,437,939 | A | 8/1995 | Beckley |
| 5,504,415 | A | 4/1996 | Podrazhansky et al. |
| 5,516,603 | A | 5/1996 | Holcombe |
| 5,534,765 | A | 7/1996 | Kreisinger et al. |

(Continued)

FOREIGN PATENT DOCUMENTS

EP 1460698 A1 9/2004

*Primary Examiner*—Edward Tso
(74) *Attorney, Agent, or Firm*—Gavrilovich, Dodd & Lindsey LLP

(57) ABSTRACT

A battery pack system is disclosed. The battery pack system includes a battery pack having batteries arranged in a plurality of parallel groups that are connected in series. Each parallel group includes a plurality of the batteries connected in parallel. The electronics are configured to drop the current at which the battery pack is operating from a first current level to a second current level one or more times. The second current level is lower than the first current level. The electronics can drop the current from the first current level to the second current level during the charge and/or discharge of the battery pack. In some instances, the electronics intermittently drop the current from the first current level to the second current level during the charge and/or discharge of the battery pack.

20 Claims, 7 Drawing Sheets

U.S. PATENT DOCUMENTS

| | | | |
|---|---|---|---|
| 5,567,544 | A | 10/1996 | Lyman |
| 5,596,567 | A | 1/1997 | deMuro et al. |
| 5,639,571 | A | 6/1997 | Waters et al. |
| 5,641,587 | A | 6/1997 | Mitchell et al. |
| 5,652,499 | A | 7/1997 | Morita et al. |
| 5,709,280 | A | 1/1998 | Beckley et al. |
| 5,736,272 | A | 4/1998 | Veenstra et al. |
| 5,851,695 | A | 12/1998 | Misra et al. |
| 5,969,503 | A | 10/1999 | Davis et al. |
| 6,002,240 | A | 12/1999 | McMahan et al. |
| 6,094,034 | A | 7/2000 | Matsuura |
| 6,140,927 | A | 10/2000 | Whitmire |
| 6,373,222 | B2 | 4/2002 | Odaohhara |
| 6,377,432 | B1 | 4/2002 | Hashimoto |
| 6,420,851 | B1 | 7/2002 | Schoofs et al. |
| 6,462,551 | B1 | 10/2002 | Coates et al. |
| 6,465,986 | B1 | 10/2002 | Haba |
| 6,479,185 | B1 | 11/2002 | Hilderbrand |
| 6,524,739 | B1 | 2/2003 | Iwaizono et al. |
| 6,565,986 | B2 | 5/2003 | Itoh |
| 6,586,132 | B1 | 7/2003 | Fukuda et al. |
| 6,639,408 | B2 | 10/2003 | Yudahira et al. |
| 6,781,343 | B1 | 8/2004 | Demachi et al. |
| 6,980,859 | B2 | 12/2005 | Powers et al. |
| 7,479,346 | B1 | 1/2009 | Chow et al. |
| 7,573,233 | B1 | 8/2009 | Chow et al. |
| 7,573,234 | B1 * | 8/2009 | Tsukamoto et al. ......... 320/116 |
| 2002/0183801 | A1 | 12/2002 | Howard et al. |
| 2003/0013009 | A1 | 1/2003 | Dansui et al. |
| 2003/0042870 | A1 * | 3/2003 | Yau et al. .................... 320/117 |
| 2003/0058595 | A1 | 3/2003 | Murabayashi et al. |
| 2003/0129457 | A1 | 7/2003 | Kawai et al. |
| 2003/0152830 | A1 | 8/2003 | Eaves |
| 2003/0186116 | A1 | 10/2003 | Tanjou |
| 2004/0018419 | A1 | 1/2004 | Sugimoto et al. |
| 2004/0058233 | A1 | 3/2004 | Hamada et al. |
| 2004/0095098 | A1 | 5/2004 | Turner et al. |
| 2004/0096713 | A1 | 5/2004 | Ballantine et al. |
| 2004/0201365 | A1 | 10/2004 | Dasgupta et al. |
| 2004/0253512 | A1 | 12/2004 | Watanabe et al. |
| 2005/0007068 | A1 | 1/2005 | Johnson et al. |
| 2005/0042505 | A1 | 2/2005 | Cooper et al. |
| 2005/0140335 | A1 | 6/2005 | Lee et al. |
| 2005/0269995 | A1 | 12/2005 | Donnelly et al. |
| 2006/0076923 | A1 | 4/2006 | Eaves |
| 2006/0208692 | A1 | 9/2006 | Kejha |
| 2007/0029124 | A1 | 2/2007 | DasGupta et al. |
| 2007/0126400 | A1 | 6/2007 | Benckenstein et al. |
| 2008/0063934 | A1 | 3/2008 | Bechtold et al. |
| 2009/0280400 | A1 | 11/2009 | Tsukamoto |

* cited by examiner

BATTERY PACK SYSTEM

RELATED APPLICATIONS

This Application is a continuation of U.S. patent application Ser. No. 11/603,757, filed on Nov. 22, 2006, now U.S. Pat. No. 7,573,234 entitled "Battery Pack System," which claims the benefit of Provisional U.S. Patent Application Ser. No. 60/740,204, filed on Nov. 28, 2005, entitled "Battery Pack System" and also of Provisional U.S. Patent Application Ser. No. 60/753,862, filed on Dec. 22, 2005, entitled "Battery Pack System," each of which is incorporated herein in its entirety.

FIELD

The present invention relates to power sources and more particularly to interconnection of multiple power sources.

BACKGROUND

As batteries play a larger role in powering the movement of vehicles such as cars, systems that employ a plurality of batteries have been designed. Different batteries will have different capacities, different self-discharge rates and/or different impedances that will affect the performance of these systems. For instance, drawing a high current from these systems can cause the voltage of one or more batteries to fall to a dangerously low level and fail while the remaining batteries remain operational. The failure of the battery can cause failure of the entire system. Because prior systems have not adequately addressed the variations in the performance of different batteries there is a need for an improved battery system.

SUMMARY

A battery pack system is disclosed. The battery pack system includes a battery pack having batteries arranged in a plurality of parallel groups that are connected in series. Each parallel group includes a plurality of the batteries connected in parallel. The electronics are configured to drop the current at which the battery pack is operating from a first current level to a second current level one or more times. The second current level is lower than the first current level. The electronics can drop the current from the first current level to the second current level during the charge and/or discharge of the battery pack. In some instances, the electronics intermittently drop the current from the first current level to the second current level during the charge and/or discharge of the battery pack.

Another embodiment of the battery pack system includes a pack assembly having a plurality of battery packs connected in a plurality of system parallel groups and in a plurality of system series groups. Each system parallel group includes a plurality of battery packs connected in parallel. Each system series group connects in series a battery pack from each of the system parallel groups. The electronics are configured to intermittently drop the current at which the pack assembly is operating from a first current level to a second current level. The second current level is lower than the first current level. The electronics can intermittently drop the current from the first current level to the second current level during the charge and/or discharge of the battery pack. In some instances, the battery packs have batteries arranged in a plurality of parallel groups and a plurality of series groups.

During discharge of the battery pack system, the second current level can be below a recharge current at which battery packs in the same system parallel group can recharge one another or below a current level at which batteries in the same system parallel group can recharge one another. In some instances, the electronics are configured to stop intermittently dropping the current from the first current level to the second current level when the first current level falls below the recharge current. Additionally or alternately, the electronics can be configured to stop intermittently dropping the current from the first current level to the second current level when the current level rises above a threshold associated with high power applications.

Methods of operating and controlling the battery pack systems are also disclosed.

DESCRIPTION

Figure 1A:
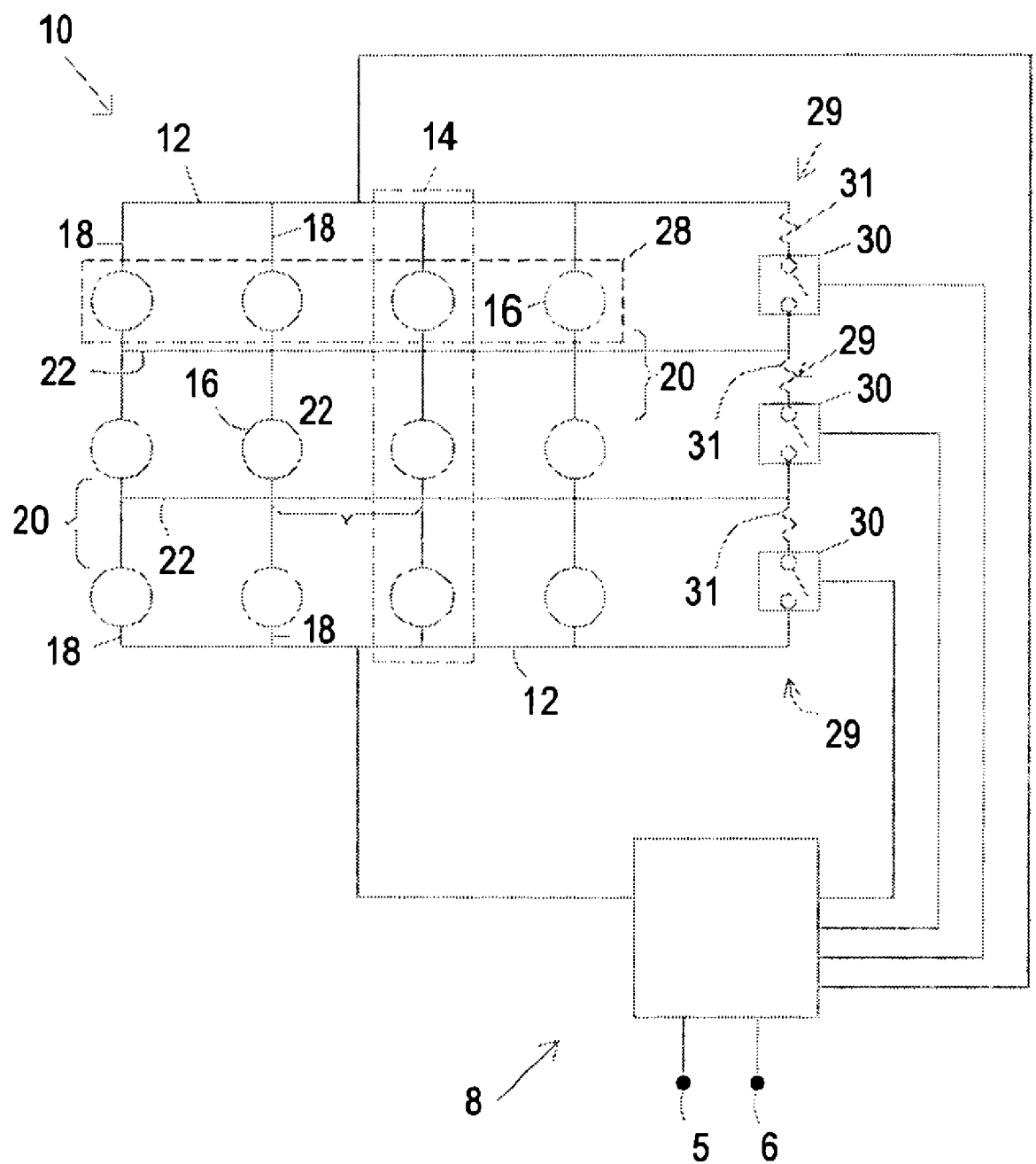
FIG. 1A is a schematic diagram of a battery pack system. The battery pack system includes electronics configured to control the charge and/or discharge of a battery pack.

The battery pack system includes electronics in electrical communication with a battery pack. The battery pack includes electronics configured to control the charge and discharge of a battery system. The battery system can include batteries arranged in a plurality of parallel groups and in a plurality of series groups. Each parallel group includes a plurality of batteries connected in parallel. Each series group connects in series a battery from each of the parallel groups. During periods of rapid discharge, different batteries in the same parallel group may have different levels of voltage drop. As a result, the voltage of one or more of the batteries in a parallel group can fall to a dangerously low level that can cause the battery to fail while the other batteries in the same parallel group remain intact. The opposite situation can occur during charging. For instance, one or more of the batteries can be charged to a dangerously high voltage. These voltage differences can be a result of capacity, self-discharge and/or impedance differentials between the different batteries. These differences can be present during the first discharge of the battery pack system or may develop over time.

During periods of low pack current, one or more batteries in a parallel group will recharge other batteries in the same parallel group until each battery in the parallel group has about the same voltage. The electronics can be configured to take advantage of this recharge capability. For instance, the electronics can be configured to intermittently drop the current from a first current level to a second current level. The first current level can be a current level at which voltage differentials can be generated between different batteries in one or more of the parallel groups and the second current level can be a level at which batteries in the same parallel group can recharge one another. As a result, the intermittent current drop provides the batteries with an opportunity to equalize their voltage.

The battery pack can also be one of a plurality of battery packs in the battery pack system. The battery pack system can include a controller configured to control the charge and/or discharge of a pack system. The pack system can include a plurality of battery packs arranged in a plurality of system parallel groups and in a plurality of system series groups. Each system parallel group includes a plurality of battery packs connected in parallel. Each system series group connects in series a battery pack from each of the system parallel groups. During periods of rapid discharge of the battery pack system, different battery packs in the same system parallel group may have different levels of voltage drop. As a result, the voltage of one or more of the battery packs in a system parallel group can fall to a dangerously low level that can cause the battery pack to fail while the other battery packs in the same system parallel group remain intact. The opposite situation can occur during charging. For instance, one or more of the battery packs can be charged to a dangerously high voltage. These voltage differences in a system parallel can be a result of capacity, self-discharge and/or impedance differentials between the different battery packs in the system parallel group.

During periods of low pack current, one or more battery packs in a system parallel group will recharge other batter packs in the same system parallel group until each battery pack in the system parallel group has about the same voltage. The controller can be configured to take advantage of this recharge capability. For instance, the controller can be configured to intermittently drop the system current from a first current level to a second current level. The first pack system current level can be a current level at which voltage differentials can be generated between different batteries in one or more of the parallel groups and the second pack system current level can be a level at which batter packs in the same parallel group can recharge one another. As a result, the intermittent current drop provides the battery packs with an opportunity to equalize their voltage.

FIG. 1A is a schematic diagram of battery pack. The battery pack includes electronics 8 in electrical communication with a battery system 10. The electronics 8 are in electrical communication with a first terminal 5 and a second terminal 6. The first terminal 5 and a second terminal 6 serve as the terminals for the battery pack.

The battery system 10 includes two primary parallel lines 12 that connect three series groups 14 in parallel. The series groups 14 each include three batteries 16 connected in series. Primary series lines 18 each provide electrical communication between a series group 14 and a primary parallel line 12 and secondary series lines 20 provide electrical communication between the batteries 16 connected in series.

The battery system 10 also includes a plurality of secondary parallel lines 22. The secondary parallel lines 22 each include one or more cross lines 24 that provide electrical communication between the secondary series lines 20 in different series groups 14. Accordingly, each secondary parallel line 22 provides a parallel connection between the batteries 16 in different series group 14. For instance, each secondary parallel line 22 provides electrical communication between different series groups 14 such that a battery 16 in one of the series groups 14 is connected in parallel with a battery 16 in the other series groups 14. Because a single secondary parallel line 22 only provides one of the parallel connections, another connection is needed to connect batteries 16 in parallel. The other parallel connection can be provided by another secondary parallel line 22 or by a primary parallel line 12. Each of the batteries 16 connected in parallel belongs to a parallel group 28. Accordingly, the battery system 10 of FIG. 1A includes three parallel groups 28.

The battery system 10 of FIG. 1A can be scaled to include more batteries or fewer batteries. For instance, the battery system 10 can include four or more batteries, twelve or more batteries, twenty-five or more batteries, eighty-one or more batteries, one hundred or more batteries. The number of batteries in each parallel group can be the same or different from the number of batteries in each series group 14. The number of batteries in each series group 14 can be increased in order to increase the voltage of the system or decreased in order to decrease the voltage of the system. Each series group 14 can include two or more batteries; four or more batteries; more than eight batteries; or fifteen or more batteries. The number of series groups 14 can be increased for applications that require higher power levels or decreased for applications that require lower power levels. In one embodiment, the battery pack includes only one parallel group and no series groups. The battery pack can include two or more series groups; four or more series groups; ten or more series groups; or fifteen or more series groups 70.

The connections between the batteries can be standard methods for connecting batteries. The connections between the batteries and the conductors can be made using connection methods that are suitable for the amount of current and power that will be delivered by the battery. For instance, conductors can be connected to a battery by welding. Additionally or alternately, one or more of the primary parallel lines and the connected primary series lines can optionally be integrated into a single line. For instance, a single wire, cable, piece of sheet metal, or metal bar can serve as both a primary parallel line and as the connected primary series lines. Additionally or alternately, one or more the secondary parallel lines and the connected secondary series lines can optionally be integrated into a single line. For instance, a single wire, cable, piece of sheet metal, or metal bar can serve as both a secondary parallel line and as the connected secondary series lines.

The battery system 10 can include one or more shunt circuits connected in parallel with a parallel group. A shunt circuit can include one or more switches and one or more resistors. For instance, the battery pack of FIG. 1A includes a plurality of shunt circuits 29 that are each configured to provide a current pathway around a parallel group. Each shunt circuit 29 includes a switch 30 connected in series with one or more resistors 31. The switches can be operated by the electronics. Each switch 30 is arranged such that one of the parallel groups is shorted when the switch is closed and but the shunt circuit is an open circuit when the switch is open. Accordingly, the parallel group is not shunted when switch is open. When a switch is closed, the associated resistor is selected to prevent the functioning batteries in the bypassed parallel group from being short circuited.

The electronics 8 include a current controller for controlling the pack current. For instance, the electronics 8 can include a pulse generator configured to generate a signal that intermittently drops the pack current from the first current level to the second current level. In one example, the current controller includes one or more switches that drop the pack current to a zero current or an open circuit current when the switch is open. Closing the switch can return the pack current to the first current level. The switch can be opened and closed to intermittently drop the current to the second current level. In another example, the current controller can include a switch in parallel with one or more resistors including variable resistors. When the switch is open the pack current will be dropped to a current limited by the one or more resistors. The resistors can be adjusted such that when the switch is open, the pack current is dropped to a second current level. When the switch is open, the one or more resistors are bypassed and the pack current rises to the first current level.

Although FIG. 1A illustrates the secondary parallel lines 22 providing electrical communication between the series groups 14 such that a battery 16 in one of the series groups 14 is connected in parallel with a battery 16 in each of the other series groups 14, the secondary parallel lines 22 can provide electrical communication between the series groups 14 such that a battery 16 in one of the series groups 14 is connected in parallel with a battery 16 in a portion of the other series groups 14.

Figure 1B:
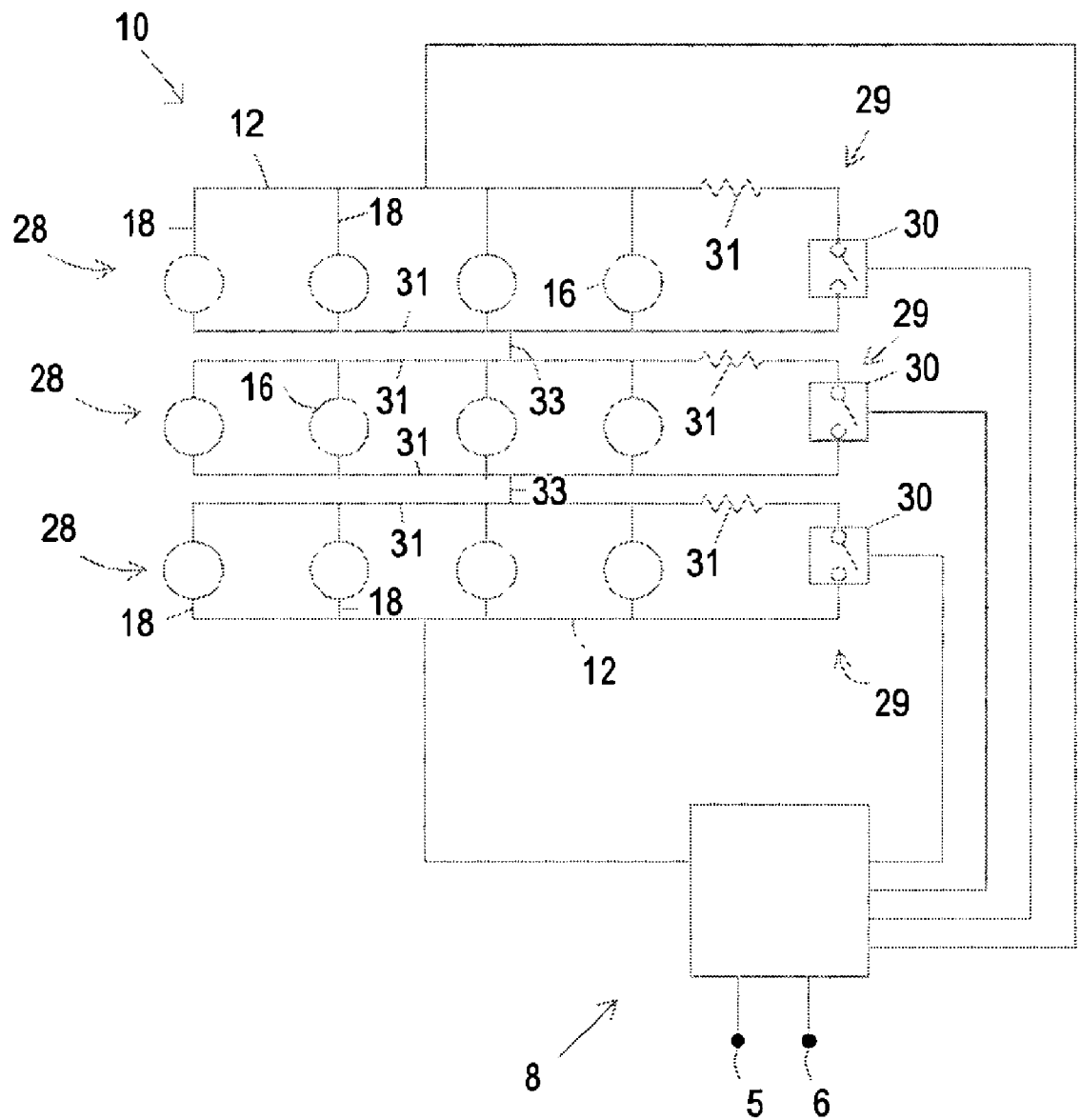
FIG. 1B is an alternate schematic for the batteries in the battery pack of FIG. 1A.

The battery assembly of FIG. 1A can also be illustrated as a plurality of parallel groups connected in series as shown in FIG. 1B. In FIG. 1B, two parallel lines 31 connected by a series line 33 replace the secondary parallel lines of FIG. 1A. The construction of the battery assembly shown in FIG. 1A may be preferable because all of the pack current must pass through the series lines of FIG. 3B. As a result, the series lines may need to be larger than other lines in the battery pack and accordingly may add weight to the battery pack.

The battery system 10 can include battery disconnection devices in series with the batteries. The battery disconnection devices can disconnect a battery from the battery system 10 to stop or reduce current flow through a battery to prevent damage to the battery or to the battery system 10. The battery disconnection devices can address undesirable increases in pressure in the battery, undesirable increases in the temperature of a battery, or undesirable current levels through a battery.

Suitable battery disconnection devices for addressing undesirable pressure increases in a battery include current interruption devices and/or burst discs. Current interruption devices are often integrated into a battery and include a diaphragm that deforms when the pressure in a battery rises above a threshold. The deformation of the diaphragm disrupts an electrical connection in the battery and accordingly disconnects the battery from the battery system.

Suitable battery disconnection devices for addressing undesirable pressure increases in a battery include positive temperature coefficient (PTC) resistors. A PTC resistor usually includes a material with temperature dependent electrical conductivity. For instance, the conductivity of the PTC material can decrease as the temperature increases. As a result, the current through the battery decreases as the battery temperature decreases. A PTC material can be coated between the active material and the substrate in an electrode or mixed in a slurry with the active material and coated on the substrate along with the active material. Additionally or alternately, the material can be employed as any of the other current carrying battery connections. Examples of a material suitable for use as a PTC include, but are not limited to, high-density polyethylene (melting point: 130 to 140.degree.), low-density polyethylene (melting point: 110 to 112.degree. C.), a polyurethane elastomer (melting point: 140-160.degree. C.), and polyvinyl chloride (melting point: about 145.degree. C.). Another suitable battery disconnection devices for addressing undesirable temperature increases in a battery include electronics for disconnecting the battery in response to temperature increases. For instance, the electronics can employ a temperature measuring device to monitor the temperature of the battery and a switch to disconnect the battery from the battery system. The electronics can disconnect the battery in the event the temperature of the battery satisfies one or more criteria.

Current interruption devices are often integrated into a battery and include a diaphragm that deforms when the pressure in a battery rises above a threshold. The deformation of the diaphragm disrupts an electrical connection in the battery and accordingly disconnects the battery from the battery system.

Suitable battery disconnection devices for addressing undesirable current increases in a battery include fuses. For instances, fuses can be positioned such that if a battery shorts, the battery is no longer in electrical communication with the rest of the batteries in the battery system 10. Accordingly, the fuses can prevent a cell that shorts in a parallel group from shorting the other cells in the parallel group. For instance, the electrical component 34 in FIG. 1C can represent a fuse positioned in series with each of the batteries. Suitable fuses 34 include, but are not limited to, traditional fuse devices and bi-metal switching devices.

An additional or alternative battery disconnection device includes a switch configured to disconnect a battery from the battery system. For instance, a switch can be positioned in series with each of the batteries. As an example, the electrical components 34 in FIG. 1C can each represent a switch. Alternately, the electrical components 34 in FIG. 1C can each represent a switch in series with a fuse. The electronics can operate the switch. For instance, the electronics can open and/or close the switch in response to detection of a fault condition associated with one or more of the batteries. The electronics can open the switch associated with the faulty battery to effectively remove the faulty battery from the battery system. In some instances, the electronics may be able to identify which parallel group includes a faulty battery but is not able to identify which battery in the identified parallel group is the faulty battery. In these instances, the electronics can sequentially open and/or close switch associated with different batteries in the identified parallel group. When removing a particular battery from the battery pack switches halts the fault condition and/or the operation of the parallel group returns to normal, the switch or combination of switches can be left open. For instance, the electronics may detect that a battery has an internal short when the voltage of a parallel group drops sharply. However, since each battery in the parallel group is at the same voltage, the electronics may not be able to identify which battery has shorted. The electronics can open different switches in the parallel group. When opening a switch is followed by a stop in the voltage drop, the switch can be left open while other switches in the parallel group are left closed. As a result, a portion of the batteries in the identified parallel group can remain functioning. Additional or alternate fault conditions that can be identified by the electronics and remedied by opening one or more switches in a parallel group include when one or more batteries has or develops an unusually high self-discharge and/or when one or more batteries has or develops an unusually low capacity and/or when one or more batteries has or develops an unusually high internal impedance.

The battery system 10 can include other electrical connections between the primary parallel lines 12. For instance, other batteries and/or series groups can be connected between the primary parallel lines 12 but not otherwise electrically connected to the illustrated series groups. Further, the battery system 10 can include other components between the primary parallel lines 12.

The electronics are configured to control the charge and discharge of the battery pack. For instance, the electronics can monitor the pack current during the charge and/or discharge of the battery pack. The electronics can operate the current controller so as to control the pack current in response to the monitored pack current. For instance, the electronics can operate the current controller so as to intermittently drop the current from a first current level to a second current level.

Figure 1C:
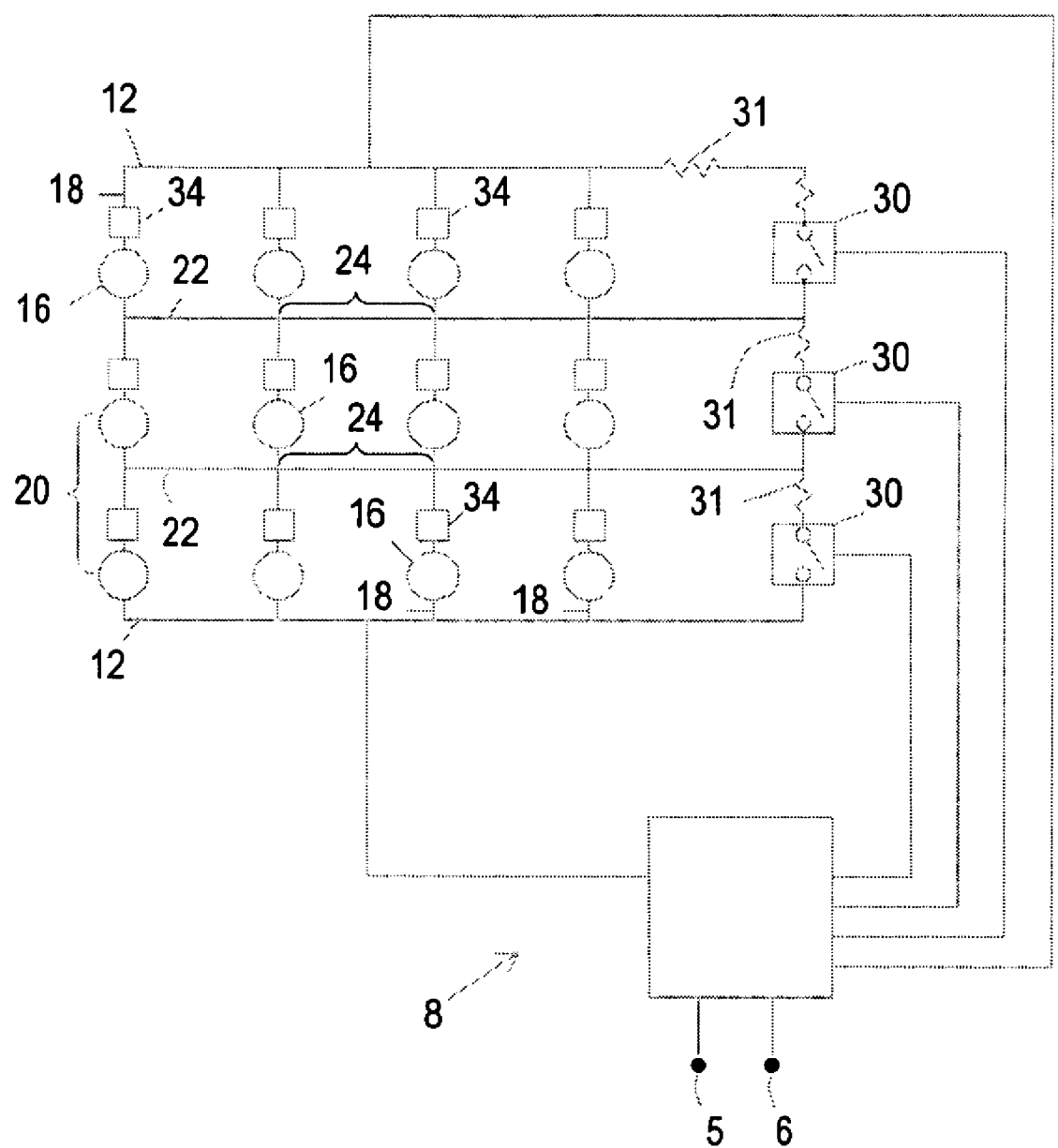
FIG. 1C is a schematic diagram of the battery pack of FIG. 1A where a fuse is positioned in series with each of the batteries.
Figure 1D:
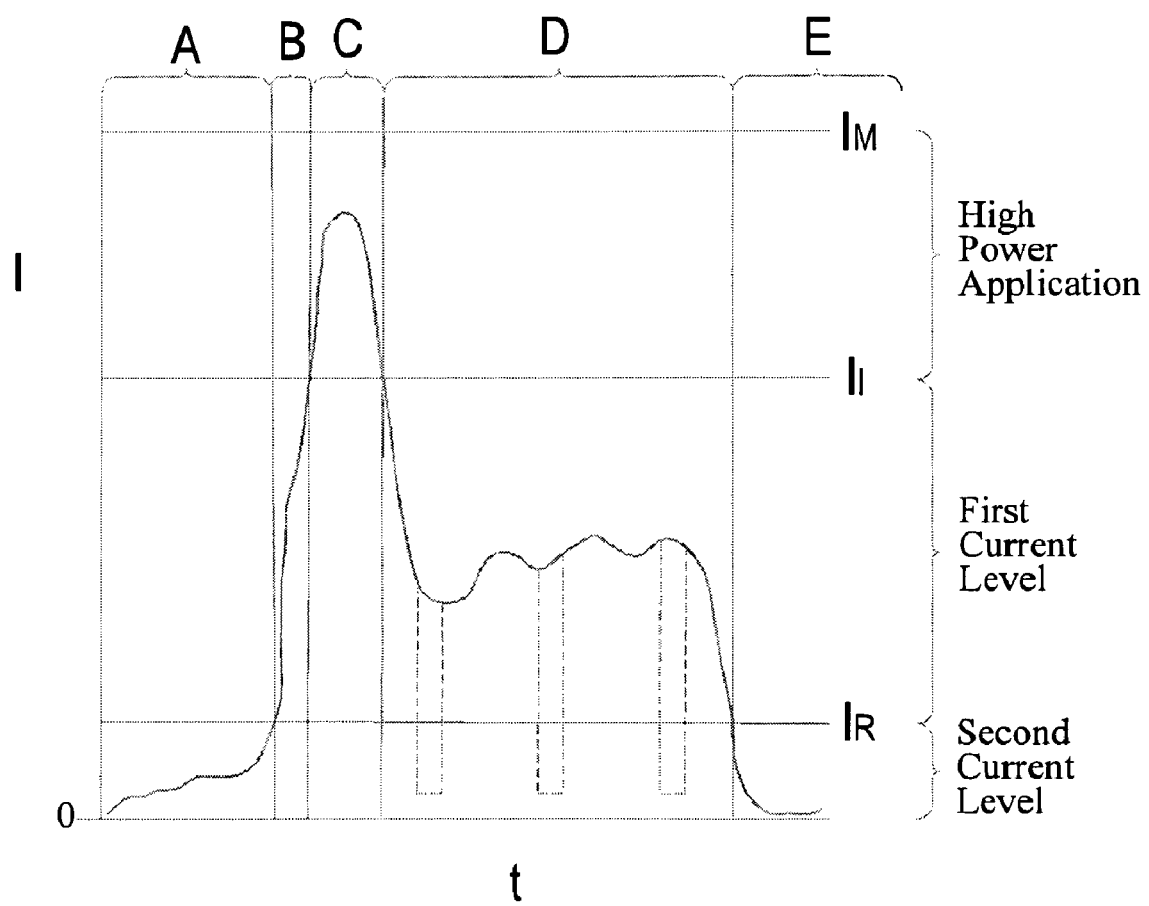
FIG. 1D illustrates a possible plot of pack current versus time for a discharging battery pack.

FIG. 1D illustrates a possible plot of pack current versus time for a discharging battery pack. The battery pack has a maximum operational current labeled $I_m$. The battery pack also has a recharge current labeled $I_R$. When the battery pack is at a current less than the recharge current, the batteries in each of the parallel groups recharge one another and can accordingly achieve the same voltage. When the pack assembly 66 is at a current above the recharge current, the batteries in each of the system parallel groups can not adequately recharge one another and differentials between the voltage of different batteries may develop. The battery pack also has an intermittent current labeled $I_i$. The range of current between the maximum operational current, $I_m$, and the intermittent current, $I_i$, is labeled a high power zone. A first current level is between the range of pack currents between the intermittent current $I_i$ and the recharge current, $I_R$. A second current level is between the range of current between the recharge current, $I_R$, and the zero current level or the open circuit current.

At different times during operation of the battery pack 2, the pack current will fall between the intermittent current, $I_i$, and the recharge current, $I_R$. For instance, FIG. 1D shows the pack current at the first current level in the time periods shown by the brackets labeled B and D. The electronics are configured such that when the pack current falls between the intermittent current, $I_i$, and the recharge current, $I_R$, the electronics intermittently drop the current to a second current level. For instance, the dashed lines in FIG. 1D illustrate the pack current during a drop to a second current level. The drop to the second current level provides batteries in the same parallel group an opportunity to recharge one another. Although the drop from the first current level to the second current level is illustrated as a continuous drop, the drop can include one or more plateaus between the first current level and the second current level.

The drop to the second current level can be a drop to a current level at or below the recharge current, $I_R$. In some instances, the second current level is zero or the open circuit current. When the second current level is greater than zero or the open circuit current, some current can still be drawn from the battery pack while the batteries in the parallel groups recharge one another. In some instances, the second current level is less than zero. A second current level less than zero can provide additional charging of the batteries above what is achieved when the second current level is zero.

The second current level can be different for each drop or for a portion of the drops. For instance, in some instances, the second current level can be zero while in other instances, the second current level is greater than zero. Alternately, the second current level can be the same for each drop. For instance, the second current level can be zero or the open circuit current during each of the drops from the first current level to the second current level.

The intermittent drop can be periodic. For instance, the electronics can drop the pack current to a second current level with the same period between drops. Alternately, the drop to a second current level can be triggered by one or more other criteria. For instance, the electronics can monitor the voltage and/or current of individual batteries. In the event that the voltage and/or current of one or more batteries rises above or falls below a threshold, the electronics can drop the pack current to the second current level. Alternately or additionally, the electronics can monitor the voltage and/or current of parallel groups. In the event that the voltage and/or current of one or more parallel groups rise above or falls below a threshold, the electronics can drop the pack current to the second current level. As a result, the drop to the second current level may occur one or more times while charging or while discharging.

The duration of the drop to a second current level can be fixed. For instance, the duration of the drop to the second current level can be the same for each time the pack current is dropped to a second current level. Alternately, the duration of the drop can be different for different drops to a second current level. For instance, the duration of the drop can be determined in response to one or more criteria. As an example, the electronics can monitor the voltage and/or current of individual batteries. As the voltage differential between different batteries in a parallel group increases, the duration of the drop to the second current level can be increased.

In some instances, the pack current may increase above the intermittent current, $I_i$. For instance, FIG. 1D shows the pack current above the intermittent current, $I_i$, in the time period shown by the brackets labeled C. This situation is most likely to occur during high power applications such as acceleration of a vehicle or pulsing applications. When the pack current is above the intermittent current, $I_i$, it may not be desirable to disrupt the current flow from the battery pack. For instance, a drop in the current level from the battery pack may cause a vehicle to be de-powered during acceleration. As a result, the electronics can optionally be configured to stop dropping the current to the second current level when the current rises above the intermittent current, $I_i$. In some instances, the intermittent current, $I_i$ is set equal to the maximum operational current, $I_m$. As a result, the intermittent drop of the current from the first current level to the second current level will continue even when the pack is operating at or near the maximum operational current, $I_m$.

In some instances, the pack current may fall below the recharge current, $I_R$. For instance, FIG. 1D shows the pack current below the recharge current, $I_R$, in the time period shown by the brackets labeled E. This situation is likely to occur during low power applications such as occur after a vehicle has reached a cruising speed. When the pack current is below the recharge current, $I_R$, it may not be necessary to drop the pack current to the second level since the batteries in the parallel groups are capable of recharging one another at this level. As a result, when the current falls below the recharge current, $I_R$: the electronics can optionally be configured to stop dropping the pack current to the second current level; the duration between the drops to the second current level can increased; or the electronics can continue to drop the pack current to the second current level according to the same protocol as was employed when the pack current is above the recharge current, $I_R$.

The electrical current provided by the battery pack at the first terminal 5 and the second terminal 6 need not be disrupted during a drop from the first current level to the second current level. For instance, the electronics can be configured to provide the battery pack with a continuous DC output. As an example, the drops from the first current level to the second current level can be periodic in that the time between each drop is the same and the duration of each drop is the same. The electronics can include an AC to DC converter that receives the signal from the battery system and provides a continuous DC output at the first terminal 5 and the second terminal 6. When the period between the drops is different from the duration of the drops, an AC to DC converter configured to handle asymmetric waveforms can provide the desired output.

During operation of the battery pack, a differential may develop between the voltage of different parallel groups. In some instances, the voltage of one or more parallel groups may rise to levels that are undesirably high or fall to levels that are undesirably low. For instance, the voltage of one or more parallel groups may rise above a safety threshold or fall below a safety threshold. In these instances, the electronics can employ a switch 30 in a shunt circuit 29 to provide a bypass around the failed parallel group. As a result, the failed parallel group is effectively removed from the battery pack permitting continued operation of the battery pack. When the electronics employ one or more of the shunt circuits, the electronics can adjust one or more other parameters. For instance, the electronics can reduce the voltage to which the battery pack is charged to prevent over-charging of the battery pack.

The shunt circuits can also be employed in response to other fault condition in the battery pack. For instance, experiments have shown that a parallel group that includes a battery that has or develops an unusually high self-discharge will contribute to the functioning of the battery pack for several cycles but subsequent cycling can cause the voltage of the parallel group to drop to an undesirably low level that can adversely affect the performance of the battery pack. Accordingly, the electronics can employ a shunt circuit to bypass a parallel group once the voltage of the parallel group falls below a threshold. When the electronics employ a shunt circuit in response to the voltage of a parallel group falling below a threshold, the shunt circuit is preferably employed when the voltage of the parallel group is at or below the threshold to reduce issues associated with shorting of more highly charged batteries as a result of employing the shunt circuit. The threshold can be higher than the minimum operational voltage of the batteries in the battery pack. Additionally, the threshold can be higher than the voltage to which the battery pack is or can be discharged before recharging or is higher than the low voltage of the voltages between which the battery pack is being cycled.

The electronics can include charging electronics for charging the battery packs 2. The electronics can be configured to recharge each of the battery packs 2 individually by applying a potential across the battery packs 2 individually. Additionally or alternately, the controller 64 can be configured to recharge the pack assembly 66 by applying a potential across the pack assembly 66. Although not illustrated, the controller 64 can include or be attachable to a power source that provides power for charging the pack assembly 66.

The effects of batteries having different levels of self-discharge, impedance and/or capacity can also cause damage to the battery pack during charging of the battery pack. As a result, the electronics can intermittently drop the pack current from a first current level to a second current level during the charge of the battery pack. The second current level can be different for each drop. For instance, in some instances, the second current level can be zero while in other instances, the second current level is greater than zero. Alternately, the second current level can be the same for each drop. For instance, the second current level can be zero or the open circuit current during each of the drops from the first current level to the second current level. In some instances, the second current level is less than the recharge current, $I_R$, disclosed in the context of FIG. 1D. In some instances, the second current level is less than zero.

When charging the battery pack, the intermittent drop can be periodic. For instance, the electronics can drop the pack current to a second current level with the same period between drops. Alternately, the drop to a second current level can be triggered by one or more other criteria. For instance, the electronics can monitor the voltage and/or current of individual batteries. In the event that the voltage and/or current of one or more batteries rises above or falls below a threshold, the electronics can drop the pack current to the second current level. Alternately or additionally, the electronics can monitor the voltage and/or current of parallel groups. In the event that the voltage and/or current of one or more parallel groups rise above or falls below a threshold, the electronics can drop the pack current to the second current level.

When charging the battery pack, the duration of the drop to a second current level can be fixed. For instance, the duration of the drop to the second current level can be the same for each time the pack current is dropped to a second current level. Alternately, the duration of the drop can be different for different drops to a second current level. For instance, the duration of the drop can be determined in response to one or more criteria. As an example, the electronics can monitor the voltage and/or current of individual batteries. As the voltage differential between different batteries in a parallel group increases, the duration of the drop to the second current level can be increased.

Suitable electronics 8 include, but are not limited to, firmware, hardware and software or a combination thereof. Examples of suitable electronics 8 include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the electronics 8 include one or more memories and one or more processing units such as a CPU. The one or more memories can include instructions to be executed by the processing unit during performance of the control and monitoring functions.

U.S. Provisional Patent Application Ser. No. 60/740,150, filed on Nov. 28, 2005, entitled "Battery System Configured To Survive Failure of One or More Batteries," and U.S. patent application Ser. No. 11/501,095, filed on Aug. 8, 2006, entitled "Battery System Configured To Survive Failure of One or More Batteries," are each incorporated herein in their entirety and disclose a method for charging and discharging a battery pack 2 having a battery system 10 constructed according to FIG. 1A through FIG. 1C such that the battery pack 2 can survive failure of one or more batteries without a substantial drop in the capacity in the battery pack 2. The electronics can charge and discharge the battery pack 2 in accordance with this disclosure in addition to intermittently dropping the current from the first current level to the second current level.

The battery pack 2 can include electronics in addition to the electronics 8 illustrated in FIG. 1A through FIG. 1C. For instance, the battery pack 2 can include electronics 8 for independently monitoring each of the batteries and/or each of the parallel groups. As a result, the battery pack 2 will require additional connections between the electronics 8 and the battery system 10 as are needed to provide the desired functions. For instance, when the voltage of different parallel groups is monitored, the electronics 8 can employ connections between the parallel lines and the electronics 8 to concurrently monitor voltage of each parallel group. Additionally, the battery pack can include ammeters and/or voltmeters as needed to perform the described functions.

The battery pack 2 can be configured to provide more than 9 V or more than 12 V. Additionally or alternately, the battery packs 2 can be configured to provide more than 50 watt-hours, more than 100 watt-hours or more than 240 watt-hours. Many of the advantages associated with the battery pack 2 do not become evident until the battery pack 2 is used for applications requiring high power levels. As a result, the battery pack 2 is suitable for high power applications such as powering the movement of vehicles such as trucks, cars and carts. For these high power applications, the battery pack 2 is preferably configured to provide more than 18 V, more than 24 V or more than 32 V. Additionally or alternately, the battery pack 2 is preferably configured to provide more than 240 watt-hours, more than 500 watt-hours or more than 1000 watt-hours. In some instances, the above performance levels are achieved using a battery pack 2 where the batteries in the series groups 14 each have a voltage of less than 14 V, 10 V or 5 V.

In some instances, one or more of the batteries are configured to provide more than 9 V or more than 12 V. Additionally or alternately, the batteries can be configured to provide more than 50 watt-hours, more than 100 watt-hours or more than 240 watt-hours. When the battery pack 2 is used for applications requiring high power levels such as powering the movement of vehicles such as trucks, cars and carts, the batteries are preferably configured to provide more than 18 V, more than 24 V or more than 32 V. Additionally or alternately, the batteries are preferably configured to provide more than 240 watt-hours, more than 500 watt-hours or more than 1000 watt-hours.

Figure 2A:
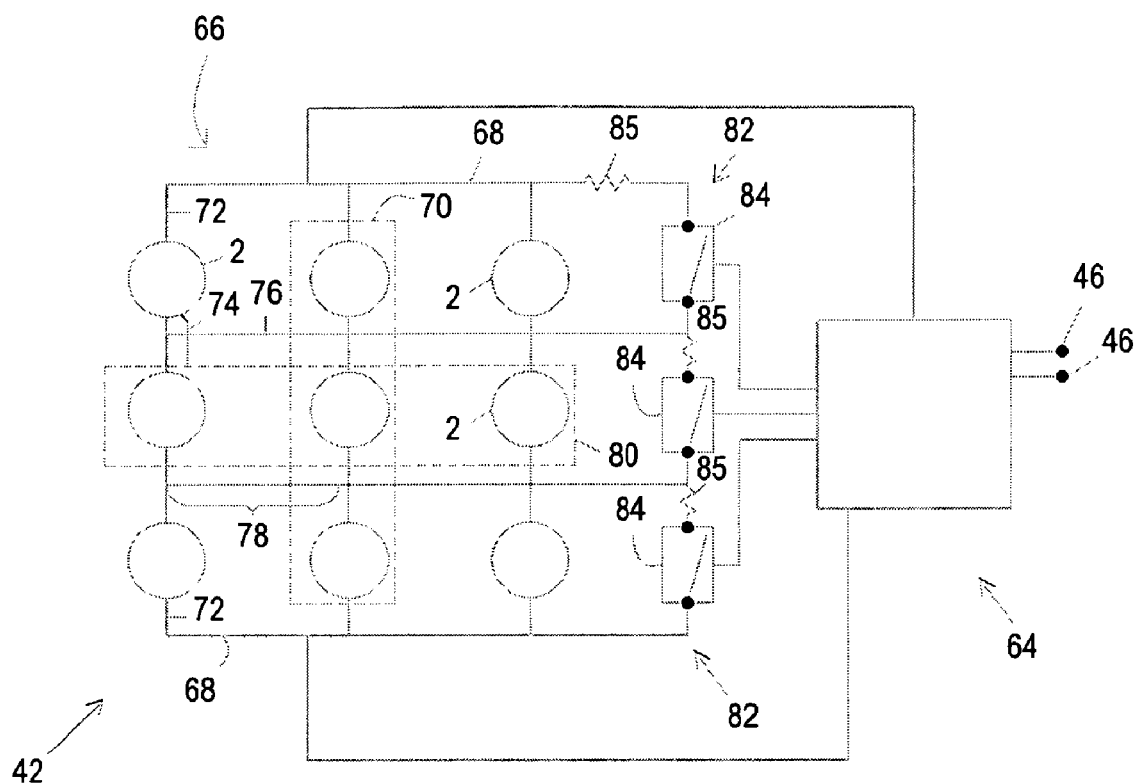
FIG. 2A is a schematic for a battery pack system that includes a plurality of battery packs. The battery pack system includes a controller in electrical communication with a pack assembly.

FIG. 2A is a schematic of a battery pack system 42. The battery pack system 42 includes a controller 64 in electrical communication with a pack assembly 66. The pack assembly includes a plurality of battery packs. All or a portion of the battery packs can be constructed according to FIG. 1A through FIG. 1D. Alternately, different battery pack constructions can be employed. Alternately, the battery packs can have battery systems according to FIG. 1A through FIG. 1C but can employ electronics with different functions or can exclude electronics altogether.

The pack assembly 66 includes two primary parallel conductors 68 that connect three system series groups 70 in parallel. The system series groups 70 each include three battery packs 2 connected in series. Primary series conductors 72 each provide electrical communication between a system series group 70 and a primary parallel conductor 68 and secondary series conductors 74 provide electrical communication between the battery packs 2 connected in series.

The pack assembly 66 also includes a plurality of secondary parallel conductors 76. The secondary parallel conductors 76 each include one or more cross conductors 78 that provide electrical communication between the secondary series conductors 74 in different system series groups 70. Accordingly, each secondary parallel conductor 76 provides a parallel connection between the battery packs 2 in different system series group 70. For instance, each secondary parallel conductor 76 provides electrical communication between different system series groups 70 such that a battery pack 2 in one of the system series groups 70 is connected in parallel with a battery pack 2 in the other system series groups 70. Because a single secondary parallel conductor 76 only provides one of the parallel connections, another connection is needed to connect battery packs 2 in parallel. The other parallel connection can be provided by another secondary parallel conductor 76 or by a primary parallel conductor 68. Each of the battery packs 2 connected in parallel belongs to a system parallel group 80. Accordingly, the pack assembly 66 of FIG. 2A includes three system parallel groups 80. As is evident from the discussion of FIG. 1B, the battery assembly of FIG. 2A can also be illustrated as a plurality of system parallel groups connected in series.

The pack assembly 66 of FIG. 2A can be scaled to include more battery packs 2 or fewer battery packs 2. For instance, the system can include four or more battery packs 2, twelve or more battery packs 2, twenty-five or more battery packs 2, eighty-one or more battery packs 2, one hundred or more battery packs 2. The number of battery packs 2 in each system parallel group 80 can be the same or different from the number of battery packs 2 in each system series group 70. The number of battery packs 2 in each system series group 70 can be increased in order to increase the voltage of the system or decreased in order to decrease the voltage of the system. Each system series group 70 can include two or more battery packs 2; four or more battery packs 2; more than eight battery packs 2; or fifteen or more battery packs 2. The number of system series groups 70 can be increased for applications that require higher power levels or decreased for applications that require lower power levels. In some instances, the pack assembly 66 includes one or more system series groups 70 and one or more system parallel groups. In one embodiment, the pack assembly includes only one system parallel group and no series groups. The pack assembly can include two or more system series groups 70; four or more system series groups 70; ten or more system series groups 70; or fifteen or more system series groups 70.

Although FIG. 2A illustrates the secondary parallel conductors 76 providing electrical communication between the system series groups 70 such that a battery pack 2 in one of the system series groups 70 is connected in parallel with a battery pack 2 in each of the other system series groups 70, the secondary parallel conductors 76 can provide electrical communication between the system series groups 70 such that a battery pack 2 in one of the system series groups 70 is connected in parallel with a battery pack 2 in a portion of the other system series groups 70.

The pack assembly 66 can include electrical connections between the primary parallel conductors 68 other than the electrical connections shown in FIG. 2A. For instance, other battery packs 2 and/or system series groups 70 can be connected between the primary parallel conductors 68 but not otherwise electrically connected to the illustrated system series groups 70. Further, the pack assembly 66 can include other components. For instance, the pack assembly 66 can include fuses positioned such that if a battery pack 2 shorts, the battery pack 2 is no longer in electrical communication with the rest of the battery packs 2 in the pack assembly 66. For instance, a fuse can be associated with each battery pack 2 and placed in series with the associated battery pack 2. Accordingly, the fuses can prevent a battery pack 2 that shorts in a system parallel group 80 from shorting the other battery pack 2 in the system parallel group 80. Suitable fuses include, but are not limited to, traditional fuse devices and bi-metal switching devices The pack assembly can include a plurality of switches that are each configured to disconnect a battery pack from the pack assembly. For instance, a switch can be associated and placed in series with each battery pack 2. In some instances, each switch is also connected in series with a fuse such that a fuse, switch, and battery pack are all connected in series. The controller can operate the switches. For instance, the controller can open and/or close the switch in response to detection of a fault condition associated with one or more of the battery packs. The controller can open the switch associated with the faulty battery pack to effectively remove the faulty battery pack from the pack assembly. In some instances, the controller may be able to identify which system parallel group includes a faulty battery pack but is not able to identify which battery pack in the identified system parallel group is the faulty battery pack. In these instances, the controller can sequentially open and/or close switches associated with different batteries in the identified parallel group. When removing a particular battery pack from the pack assembly halts the fault condition and/or the operation of the system parallel group returns to normal, the switch or combination of switches can be left in the condition that associated with the removal of that battery pack from the pack assembly. For instance, the controller may detect that a battery pack has an internal short when the voltage of a system parallel group drops sharply. However, since each battery pack in the system parallel group is at the same voltage, the controller may not be able to identify which battery pack has shorted. The controller can open different switches in the system parallel group. When opening a switch is followed by a stop in the voltage drop, the switch can be left open while other switches in the system parallel group are left closed. As a result, a portion of the battery packs in the identified system parallel group can remain functioning. Additional or alternate fault conditions that can be identified by the controller and remedied by opening one or more switches in a system parallel group include when one or more battery packs has or develops an unusually high self-discharge and/or when one or more battery packs has or develops an unusually low capacity and/or when one or more battery packs has or develops an unusually high internal impedance.

The pack assembly 66 can include one or more shunt circuits connected in parallel with a system parallel group. A shunt circuit can include one or more switches and one or more resistors. For instance, the pack assembly 66 of FIG. 2A includes a plurality of shunt circuits 82 that are each configured to provide a current pathway around a system parallel group. Each shunt circuit 82 includes a switch 84 connected in series with a resistor 85. The switches can be operated by the electronics. Each switch 84 is arranged such that one of the system parallel groups is shorted when the switch is closed and but the shunt circuit is an open circuit when the switch is open. Accordingly, the system parallel group is not shorted when switch is open. When a switch is closed, the associated resistor is selected to prevent the functioning batteries in the bypassed system parallel group from being short circuited.

The controller includes a current controller 86 for controlling the pack current. For instance, the controller can include a pulse generator configured to generate a pulse signal that intermittently drops the pack current from the first current level to the second current level. In one example, the current controller includes one or more switches that drop the pack current to a zero current or an open circuit current when the switch is open. Closing the switch can return the pack current to the first current level. The switch can be opened and closed to intermittently drop the current to the second current level. In another example, the current controller can include a switch in parallel with one or more resistors including variable resistors. When the switch is open the pack current will be dropped to a current limited by the one or more resistors. The resistors can be adjusted such that when the switch is open, the pack current is dropped to a second current level. When the switch is open, the one or more resistors are bypassed and the pack current rises to the first current level.

The controller is configured to control the charge and discharge of the pack assembly 66. For instance, the controller can monitor the system current during the charge and/or discharge of the pack assembly 66. The controller can operate the current controller 86 so as to control the system current in response to the monitored system current. For instance, the controller can operate the current controller 86 so as to intermittently drop the current from a first current level to a second current level in response to the monitored system current falling within a predetermined range.

Figure 2B:
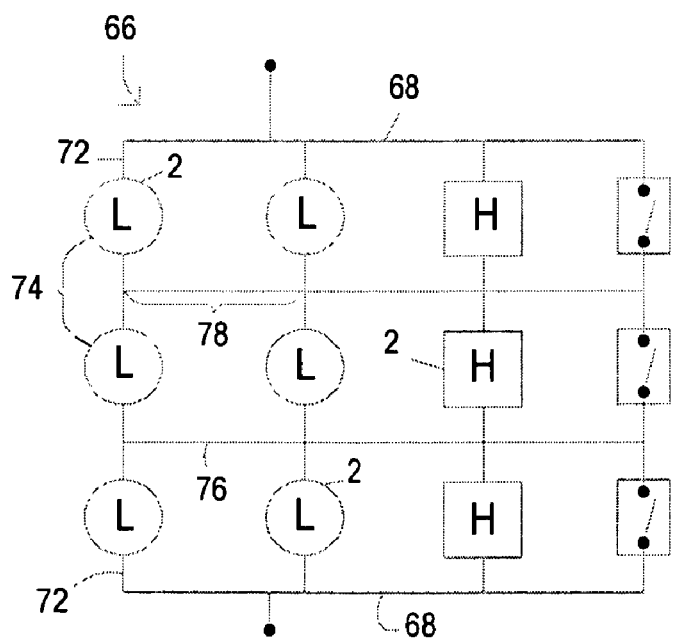
FIG. 2B is a schematic for a pack assembly that includes both high power sources and low power sources.
Figure 2C:
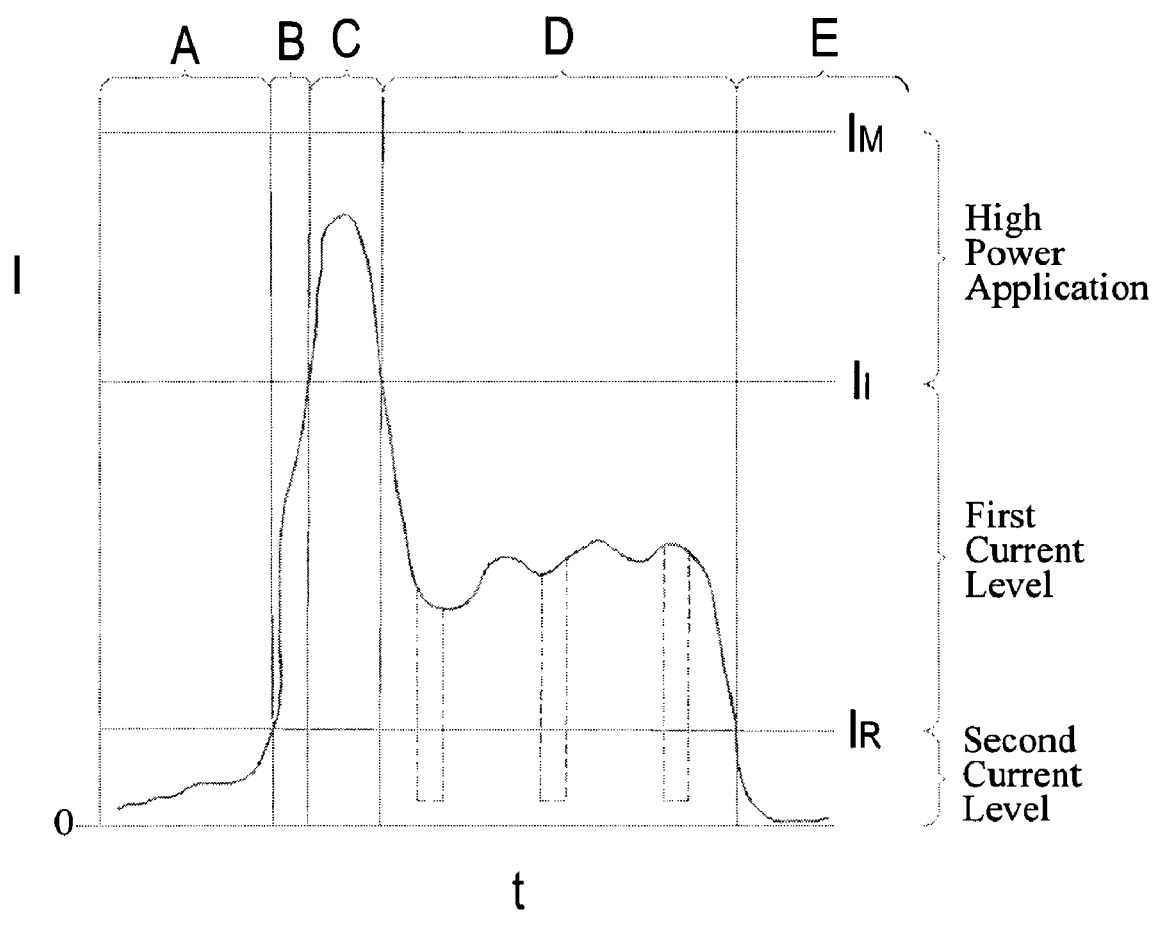
FIG. 2C illustrates a possible plot of pack current versus time for a discharging battery pack assembly.

FIG. 2C illustrates a possible plot of system current versus time for a pack assembly 66 during discharge of the pack assembly 66. The pack assembly 66 has a maximum operational current labeled $I_m$. The pack assembly 66 also has a recharge current labeled $I_R$. When the pack assembly 66 is at a current less than the recharge current, the battery packs in each of the system parallel groups recharge one another and can accordingly achieve the same voltage. When the pack assembly 66 is at a current above the recharge current, the battery packs in each of the system parallel groups can not adequately recharge one another and differentials between the voltage of different packs may develop. The pack assembly 66 also has an intermittent current labeled $I_i$. The range of system currents between the maximum operational current, $I_m$, and the intermittent current, $I_i$, is labeled a high power zone. A first current level is in the range of system currents from the intermittent current $I_i$ to the recharge current, $I_R$. A second current level is in the range of system currents from the recharge current, $I_R$, and the zero current level or the open circuit current.

At various times during operation of the pack assembly 66, the system current will fall between the intermittent current, $I_i$, and the recharge current, $I_R$. For instance, FIG. 1D shows the system current at the first current level in the time periods shown by the brackets labeled B and D. The controller is configured such that when the system current falls between the intermittent current, $I_i$, and the recharge current, $I_R$, the controller intermittently drop the current to the second current level. For instance, the dashed lines in FIG. 2C illustrate the system current during a drop to a second current level. The drop to the second current level provides battery packs in the same system parallel group an opportunity to recharge one another. Although the drop from the first current level to the second current level is illustrated as a continuous drop, the drop can include one or more plateaus between the first current level and the second current level.

The drop to the second current level can be a drop to a current level at or below the recharge current, $I_R$. In some instances, the second current level is zero or the open circuit current. When the second current level is greater than zero or the open circuit current, some current can still be drawn from the pack assembly while the battery packs in the system parallel groups recharge one another. In some instances, the second current level is less than zero. A second current level less than zero can provide additional charging of the batteries above what is achieved when the second current level is zero.

The second current level can be different for each drop. For instance, in some instances, the second current level can be zero while in other instances, the second current level is greater than zero. Alternately, the second current level can be the same for each drop. For instance, the second current level can be zero or the open circuit current during each of the drops from the first current level to the second current level.

The intermittent drop can be periodic. For instance, the controller can drop the system current to a second current level with the same period between drops. Alternately, the drop to a second current level can be triggered by one or more other criteria. For instance, the controller can monitor the voltage and/or current of individual battery packs. In the event that the voltage and/or current of one or more battery packs rises above or falls below a threshold, the controller can drop the system current to the second current level. Alternately or additionally, the controller can monitor the voltage and/or current of system parallel groups. In the event that the voltage and/or current of one or more system parallel groups rise above and/or falls below a threshold, the controller can drop the system current to the second current level. As a result, the drop to the second current level may occur one or more times while charging or while discharging.

The duration of the drop to a second current level can be fixed. For instance, the duration of the drop to the second current level can be the same for each time the system current is dropped to a second current level. Alternately, the duration of the drop can be different for different drops to a second current level. For instance, the duration of the drop can be determined in response to one or more criteria. As an example, the controller can monitor the voltage and/or current of individual battery packs. As the voltage differential between different battery packs in a system parallel group increases, the duration of the drop to the second current level can be increased.

In some instances, the system current may increase above the intermittent current, $I_i$, into the high power zone. For instance, FIG. 1D shows the system current above the intermittent current, $I_i$, in the time period shown by the brackets labeled C. This situation is most likely to occur during high power applications such as acceleration of a vehicle or pulsing applications. When the system current is above the intermittent current, $I_i$, it may not be desirable to disrupt the current flow from the pack assembly. For instance, a drop in the current level from the pack assembly may cause a vehicle to be de-powered during acceleration. As a result, the controller can optionally be configured to stop dropping the current to the second current level when the current rises above the intermittent current, $I_i$. In some instances, the intermittent current, $I_i$ is set equal to the maximum operational current, $I_m$. As a result, the intermittent drop of the current from the first current level to the second current level will continue even when the pack is operating at or near the maximum operational current, $I_m$.

In some instances, the system current may fall below the recharge current, $I_R$. For instance, FIG. 1D shows the system current below the recharge current, $I_R$, in the time period shown by the brackets labeled E. This situation is likely to occur during low power applications such as occur after a vehicle has reached a cruising speed. When the system current is below the recharge current, $I_R$, it may not be necessary to drop the system current to the second level since the battery packs in the system parallel groups are capable of recharging one another at this level. As a result, when the current falls below the recharge current, $I_R$: the controller can optionally be configured to stop dropping the system current to the second current level; the duration between the drops to the second current level can increased; or the controller can continue to drop the system current to the second current level according to the same protocol as was employed when the system current is above the recharge current, $I_R$.

The electrical current provided by the battery pack system at the terminals 46 need not be disrupted during a drop from the first current level to the second current level. For instance, the electronics can be configured to provide the battery pack with a continuous DC output. As an example, the drops from the first current level to the second current level can be periodic in that the time between each the drops is constant and the duration of each drop is constant. The electronics can include an AC to DC converter that receives the signal from the battery system and provides a continuous DC output at the first terminal 5 and the second terminal 6. When the period between the drops is different from the duration of the drops, an AC to DC converter can be configured to handle asymmetric waveforms can provide the desired output.

During operation of the pack assembly, a differential may develop between the voltage of different system parallel groups. In some instances, the voltage of one or more system parallel groups may rise to levels that are undesirably high or fall to levels that are undesirably low. For instance, the voltage of one or more system parallel groups may rise above a safety threshold or fall below a safety threshold. In these instances, the controller can employ a switch 84 in a shunt circuit 82 to provide a short around the failed system parallel group. As a result, the failed system parallel group is effectively removed from the pack assembly permitting continued operation of the pack assembly. When the controller employs one or more of the shunt circuits, the controller can adjust one or more other parameters. For instance, the controller can reduce the voltage to which the pack assembly is charged to prevent overcharging of the pack assembly.

The shunt circuits can also be employed in response to other fault condition in the battery pack assembly. For instance, a system parallel group that includes a battery pack that has or develops an unusually high self-discharge may contribute to the functioning of the battery pack for several cycles but subsequent cycling may cause the voltage of the system parallel group to drop to an undesirably low level that can adversely affect the performance of the battery pack assembly. Accordingly, the controller can employ a shunt circuit to bypass a system parallel group once the voltage of the system parallel group falls below a threshold. When the controller employs a shunt circuit in response to the voltage of a parallel group falling below a threshold, the shunt circuit is preferably employed when the voltage of the parallel group is at or below the threshold to reduce the issues associated with shorting of more highly charged batteries as a result of employing the shunt circuit. The threshold can be higher than the minimum operational voltage of the battery packs in the pack assembly. Additionally, the threshold can be higher than the voltage to which the pack assembly is or can be discharged before recharging or is higher than the low voltage of the voltages between which the battery pack assembly is being cycled.

The controller 64 can include charging electronics for charging the battery packs 2. The controller 64 can be configured to recharge each of the battery packs 2 individually by applying a potential across the battery packs 2 individually. Additionally or alternately, the controller 64 can be configured to recharge the pack assembly 66 by applying a potential across the pack assembly 66. Although not illustrated, the controller 64 can include or be attachable to a power source that provides power for charging the pack assembly 66.

The effects of batteries having different levels of self-discharge, impedance and/or capacity can also cause damage to the pack assembly during charging of the battery pack. As a result, the electronics can intermittently drop the pack current from a first current level to a second current level during the charge of the battery pack. The second current level can be different for each drop. For instance, in some instances, the second current level can be zero while in other instances, the second current level is greater than zero. Alternately, the second current level can be the same for each drop. For instance, the second current level can be zero or the open circuit current during each of the drops from the first current level to the second current level. In some instances, the second current level is less than the recharge current, $I_R$, disclosed in the context of FIG. 2C. In some instances, the second current level is less than zero.

When charging the pack assembly, the intermittent drop can be periodic. For instance, the controller can drop the system current to a second current level with the same period between drops. Alternately, the drop to a second current level can be triggered by one or more other criteria. For instance, the controller can monitor the voltage and/or current of individual battery packs. In the event that the voltage and/or current of one or more battery packs rises above or falls below a threshold, the controller can drop the system current to the second current level. Alternately or additionally, the controller can monitor the voltage and/or current of system parallel groups. In the event that the voltage and/or current of one or more system parallel groups rise above or falls below a threshold, the controller can drop the system current to the second current level.

When charging the pack assembly, the duration of the drop to a second current level can be fixed. For instance, the duration of the drop to the second current level can be the same for each time the pack current is dropped to a second current level. Alternately, the duration of the drop can be different for different drops to a second current level. For instance, the duration of the drop can be determined in response to one or more criteria. As an example, the controller can monitor the voltage and/or current of individual batteries. As the voltage differential between different batteries in a parallel group increases, the duration of the drop to the second current level can be increased.

U.S. Provisional Patent Application Ser. No. 60/740,150, filed on Nov. 28, 2005, entitled "Battery System Configured To Survive Failure of One or More Batteries," and U.S. patent application Ser. No. 11/501,095, filed on Aug. 8, 2006, entitled "Battery System Configured To Survive Failure of One or More Batteries," are each incorporated herein in their entirety and disclose a method for charging and discharging a battery pack 2 having a battery system 10 constructed according to FIG. 1A through FIG. 1C such that the battery pack 2 can survive failure of one or more batteries without a substantial drop in the capacity in the battery pack 2. The disclosure of this Patent Application can be adapted to charging and discharging the pack assembly 66. As a result, the controller 64 can charge and discharge a pack assembly 66 in accordance with this disclosure in addition to intermittently dropping the current from the first current level to the second current level.

The battery pack system 42 can include electronics in addition to the electronics illustrated in FIG. 2A. For instance, the battery pack system 42 can include electronics for charging the pack assembly 66 by applying a potential across the pack assembly 66. As a result, the battery pack system 42 may require additional connections between the controller 64 and the pack assembly 66. Additionally, the battery pack assembly 42 can include ammeters and/or voltmeters as needed to perform the described functions.

Suitable controllers 64 can include firmware, hardware and software or a combination thereof. Examples of suitable controllers 64 include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the controller 64 includes one or more memories and one or more processing units such as a CPU. The one or more memories can include instructions to be executed by the processing unit during performance of the control and monitoring functions.

In some instances, the battery packs 2 in a pack assembly 66 can be different from one another. For instance, a portion of the battery packs 2 can be high power sources and a portion of the battery packs 2 can be low power sources. In one example, the battery pack assembly includes only one system parallel group that includes one or more high power sources and one or more low power sources. A high power source has a mass based power density (gravimetric power density) that is more than the mass based power density of the low power sources. Additionally or alternately, the low power sources can have an impedance that is more than three times the impedance of the high power sources. Additionally or alternately, a low power source can have a capacity that is more than the capacity of a high power source. In some instances, the high power sources have a mass based power density that is more than twice the mass based power density of the low power sources before discharge of the pack assembly or that is more than four times the mass based power density of the low power sources before discharge of the pack assembly. Additionally or alternately, in some instances, at least one low power source has a capacity that is greater than a capacity of at least one high power source or that is greater than 1.2 times the capacity of at least one high power source.

Each system parallel group 80 can include one or more high power sources and one or more low power sources. The battery packs 2 can be arranged such that one or more system series groups 70 include only high power sources and one or more system series groups 70 include only low power sources. For instance, FIG. 2B is a schematic for a pack assembly 66 with one system series group 70 that employs only high power sources as illustrated by the battery packs 2 labeled H and two system series groups 70 that employ only low power sources as illustrated by the battery packs 2 labeled L. In one example, the pack assembly 66 has only one parallel group that includes one or more high power sources and one or more low power sources. Since the high power sources can have a mass based power density that is more than the mass based power density of the low power sources and the low power sources can have an impedance that is more than the impedance of the high power sources, the current can flow primarily from the high power sources during high power applications such as pulsing. When the power demands on the pack assembly drops, the portion of the current provided by the low power sources increases. During the high power application, the low power sources will have discharged less energy than the high power sources. As a result, the high power sources will be associated with a higher voltage drop than the low power sources. However, because the parallel lines maintain the power sources in the same parallel group at the same voltage, the low power sources will recharge the high power sources. This arrangement permits the battery assembly to repeatedly satisfy the requirements of high power applications and low power applications.

Additional details about the construction, operation, and/or electronics for a battery pack 2 and battery pack systems 42 can be found in U.S. Provisional Patent Application Ser. No. 60/601,285; filed on Aug. 13, 2004; entitled "Battery Pack;" and in U.S. patent application Ser. No. 11/201,987; filed on Aug. 10, 2005; and entitled "Battery Pack;" and in U.S. Patent Application Ser. No. 60/707,500; filed on Aug. 10, 2005; and entitled "Battery System;" and in U.S. Patent Application Ser. No. 60/740,150; filed on Nov. 28, 2005; and entitled "Battery System Configured to Survive Failure of One or More Batteries;" and in U.S. patent application Ser. No. 11/501,095, filed on Aug. 8, 2006, entitled "Battery System Configured To Survive Failure of One or More Batteries;" and in U.S. Patent Application Ser. No. 60/740,204; filed on Nov. 28, 2005; and entitled "Battery Pack System;" and in U.S. Patent Application Ser. No. 60/740,202; filed on Nov. 28, 2005; and entitled "Battery Pack System;" and in U.S. patent application Ser. No. 11/269,285; filed on Nov. 8, 2005; and entitled "Modular Battery Pack;" each of which is incorporated herein in its entirety. When possible, the functions of the electronics and/or controllers described in the above applications can be performed in addition to the functions described in this application.

Although the function of the electronics 8 of FIG. 1A and the controller 64 of FIG. 2A are described separately, in many instances, all or a portion of the electronics functions are incorporated into the controller. Accordingly, in some instances, the battery packs can exclude the electronics 8. Alternately, all or a portion of the controller functions can be incorporated into the electronics.

Figure 3:
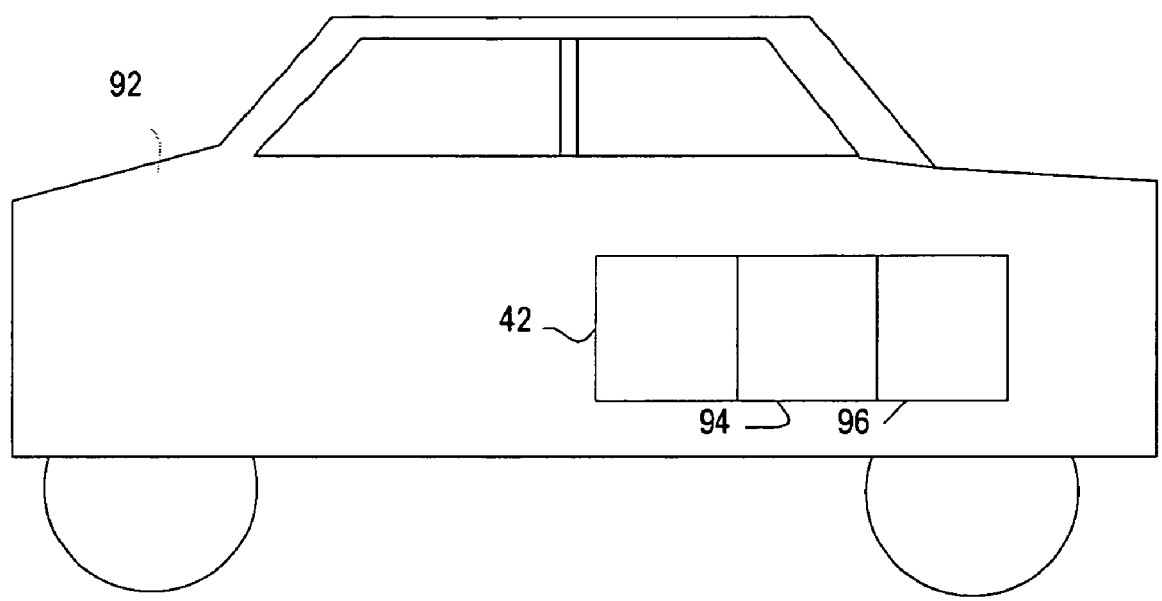
FIG. 3 illustrates a battery pack system employed in a vehicle.

The battery pack system 42 can be employed to power movement of a vehicle. Examples of suitable vehicles are vehicles configured to hold and transport living people such as cars, truck and golf-carts. In some instances, the vehicles are for transporting people on land. FIG. 3 illustrates a battery pack system 42 employed in a vehicle 92. The battery pack system 42 provides an electrical signal to a power source 94 which is connected to a power train 96. The power train is configured to transmit power from the power source to a drive mechanism (not shown) such as a drive axel. The power source can include a motor and/or engine. The battery system can assist the motor and/or engine in generating movement of the vehicle 92. Alternately, the battery system can be the only source of power provided to the power source. Although the battery pack system 42 is disclosed in the context of a battery for powering vehicles, the battery pack system 42 can be employed in other applications.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery pack system, comprising:
a battery pack including a plurality of parallel groups connected in series, each parallel group including a plurality of batteries connected in parallel; and
electronics configured to charge the battery pack at a first current level and to drop the current from the first current level to a second current level one or more times while charging the battery pack, the second current level being lower than the first current level.

2. The system of claim 1, wherein the electronics are configured to drop the current from the first current level to a second current level at a regular interval.

3. The system of claim 1, wherein a time period over which the current is dropped to the second current level is constant for each event where the current is dropped to the second current level.

4. The system of claim 1, wherein the first current level is a current level required to charge the battery pack.

5. The system of claim 1, wherein the second current level is an open circuit current level for the battery pack.

6. The system of claim 1, wherein the second current level is below a recharge current at which the batteries in a parallel group are able to recharge other batteries in the same parallel group.

7. The system of claim 1, wherein the battery pack is one of a plurality of battery packs, each of the battery packs connected in a plurality of system parallel groups that are connected in series, each system parallel group including a plurality of battery packs connected in parallel.

8. A battery pack system, comprising:
a plurality of system parallel groups connected in series, each system parallel group including a plurality of battery packs connected in parallel;
each battery pack including a plurality of parallel groups connected in series, each parallel group including a plurality of batteries connected in parallel;
electronics configured to charge the battery packs at a first current level and to drop the current from the first current level to a second current level one or more time while charging the battery packs, the second current level being lower than the first current level;
the electronics being configured to stop intermittently dropping the current from the first current level to the second current level when the first current level rises above an upper current threshold; and
the electronics being configured to stop intermittently dropping the current from the first current level to the second current level when the first current level falls below a lower current threshold.

9. A battery pack system, comprising:
a pack assembly having a plurality of system parallel groups connected in series, each system parallel group including a plurality of battery packs connected in parallel;
electronics configured to charge the pack assembly at a first current level and to intermittently drop the current from the first current level to a second current level while charging the pack assembly, the second current level being lower than the first current level.

10. The system of claim 9, wherein the electronics are configured to drop the current from the first current level to a second current level at a regular time interval.

11. The system of claim 9, wherein a time period over which the current is dropped to the second current level is constant for each event where the current is dropped to the second current level.

12. The system of claim 9, wherein the first current level is a current level required to charge the pack assembly.

13. The system of claim 9, wherein the second current level is an open circuit current level for the pack assembly.

14. The system of claim 9, wherein the second current level is below a recharge current at which the battery packs in a system parallel group are able to recharge other batteries in the same system parallel group.

15. A battery pack system, comprising:
a battery pack including a plurality of parallel groups connected in series, each parallel group including a plurality of batteries connected in parallel;
electronics configured to discharge and/or charge the battery pack; and
one or more shunt circuits configured to bypass one or more of the parallel groups, the shunt circuits being activated by the electronics.

16. A battery pack system, comprising:
a pack assembly having a plurality of system parallel groups connected in series, each system parallel group including a plurality of battery packs connected in parallel;
electronics configured to charge and/or discharge the pack assembly; and one or more shunt circuits configured to bypass one or more of the system parallel groups, the shunt circuits being activated by the electronics.

17. A battery pack system, comprising:
a battery pack including a plurality of parallel groups connected in series, each parallel group including a plurality of batteries connected in parallel;
electronics configured to discharge and/or charge the battery pack; and
a switch connected in series with one or more batteries, the switch being operated by the electronics.

18. The system of claim 17, wherein the electronics are configured to open a switch connected in series with a battery in response to detecting a fault condition at that battery.

19. A battery pack system, comprising:
a pack assembly having a plurality of system parallel groups connected in series, each system parallel group including a plurality of battery packs connected in parallel;
electronics configured to charge and/or discharge the pack assembly; and
a switch connected in series with one or more battery pack, the switch being operated by the electronics.

20. The system of claim 19, wherein the electronics are configured to open a switch connected in series with a battery pack in response to detecting a fault condition at that battery pack.

* * * * *